(12) United States Patent
Henkel

(10) Patent No.: US 12,511,387 B2
(45) Date of Patent: Dec. 30, 2025

(54) METHOD AND SYSTEM FOR INCREMENTAL CENTROID CLUSTERING

(71) Applicant: BlackBerry Limited, Waterloo (CA)

(72) Inventor: Steven John Henkel, Waterloo (CA)

(73) Assignee: BlackBerry Limited, Waterloo (CA)

( * ) Notice: Subject to any disclaimer, the term of this patent is extended or adjusted under 35 U.S.C. 154(b) by 446 days.

(21) Appl. No.: 18/083,102

(22) Filed: Dec. 16, 2022

(65) Prior Publication Data

US 2024/0202336 A1 Jun. 20, 2024

(51) Int. Cl.
*G06F 21/56* (2013.01)
*G06F 16/28* (2019.01)
*H04L 9/40* (2022.01)
*G06N 20/10* (2019.01)

(52) U.S. Cl.
CPC .......... *G06F 21/566* (2013.01); *G06F 16/285* (2019.01); *G06F 2221/034* (2013.01); *G06N 20/10* (2019.01)

(58) Field of Classification Search
CPC .............. G06F 21/566; G06F 16/285; G06F 2221/034; G06F 21/56; G06F 16/28; G06N 20/10; H04L 9/40
See application file for complete search history.

(56) References Cited

U.S. PATENT DOCUMENTS

| | | | | |
|---|---|---|---|---|
| 11,237,897 | B2* | 2/2022 | Bhatia | G06N 20/20 |
| 12,008,022 | B2* | 6/2024 | Naohara | G06N 5/04 |
| 2016/0342903 | A1* | 11/2016 | Shumpert | G06F 11/008 |
| 2018/0329977 | A1* | 11/2018 | Soceanu | G06F 21/6227 |
| 2019/0138423 | A1* | 5/2019 | Agerstam | G06F 11/3466 |
| 2020/0351283 | A1* | 11/2020 | Salunke | H04L 63/1425 |
| 2021/0103260 | A1* | 4/2021 | Khurana | G05B 23/0237 |
| 2024/0048581 | A1* | 2/2024 | Akella | G06F 16/285 |

FOREIGN PATENT DOCUMENTS

WO    WO-2021222495 A1 *  11/2021  ........... G06K 9/6228

OTHER PUBLICATIONS

European Patent office (EPO) Extended European Search Report (EESR) for Application No. EP 23 21 5114 dated May 8, 2024, 10 pages.
Zhao et al., "An incremental clustering method for anomaly detection in flight data", Transportation Research Part C 132 (2021) 103406, Elsevier, 27 pages.
Balega et al., "IoT Anomaly Detection Using a Multitude of Machine Learning Algorithms", 2022 IEEE Applied Imagery Pattern Recognition Workshop (AIPR), IEEE, 2022, 7 pages.

(Continued)

*Primary Examiner* — Jayesh M Jhaveri
(74) *Attorney, Agent, or Firm* — Moffat & Co

(57) ABSTRACT

A method at a computing device for anomaly detection, the method including storing, at the computing device, a full batch model for a plurality of data points, wherein each of the plurality of data points is associated with one of a plurality of clusters, and wherein the storing comprises a table for storing information about the plurality of clusters without storing the plurality of data points; receiving a new data point from a hardware sensor; determining that the new data point falls outside the full batch model, thereby detecting an anomaly; and performing an action based on the anomaly.

19 Claims, 12 Drawing Sheets

(56) References Cited

OTHER PUBLICATIONS

Burbeck & Nadjm-Tehrani, "Adaptive real-time anomaly detection with incremental clustering", Information Security Technical Report 12 (2007) 56-67, Elsevier, 12 pages.
Ackerman & Dasgupta, "Incremental Clustering: The Case for Extra Clusters", arXiv preprint arXiv:1406.6398v1, 2014, 9 pages.
"Mini-Batch K-Means clustering", scikit-learn developers, dated Oct. 9, 2022, pp. 1-7.

* cited by examiner

|  | Prediction | |
|---|---|---|
|  | Benign | Anomalous |
| Actual Benign | True Positive 1110 | False Negative 1120 |
| Actual Anomalous | False positive 1130 | True Negative 1140 |

METHOD AND SYSTEM FOR INCREMENTAL CENTROID CLUSTERING

FIELD OF THE DISCLOSURE

The present disclosure relates to anomaly detection systems, and in particular relates to machine learning for anomaly detection systems.

BACKGROUND

Anomaly detection is a process by which outliers in a dataset can be identified. It plays a role in complex software systems such as distributed systems and allows threats to the system to be detected, root causes of errors to be identified, monitoring of the health of a system, cleaning of data, among other benefits.

Traditionally, anomaly detection systems were built manually. This involved significant domain knowledge and foresight of issues likely to be encountered. Further, such systems tend to be static, which is undesirable when the threats to the system may evolve.

In this regard, machine learning algorithms have more recently been used to create such anomaly detection systems. Such machine learning algorithms generally create systems that are able to handle large data sets, can be adaptive over time, and may work better than manual creation. Examples of such machine learning algorithms include One Class Support Vector Method (SVM), Random Forest, Local Outlier Factor, among others.

However, such machine learning algorithms have significant overhead in terms of both processing and memory requirements. Thus, these algorithms are not practical for being implemented within distributed systems, where processing modules on the edge of such systems may not have the memory or processing power needed to effectively run such algorithms.

BRIEF DESCRIPTION OF THE DRAWINGS

The present disclosure will be better understood with reference to the drawings, in which.

DETAILED DESCRIPTION OF THE DRAWINGS

Figure 1:
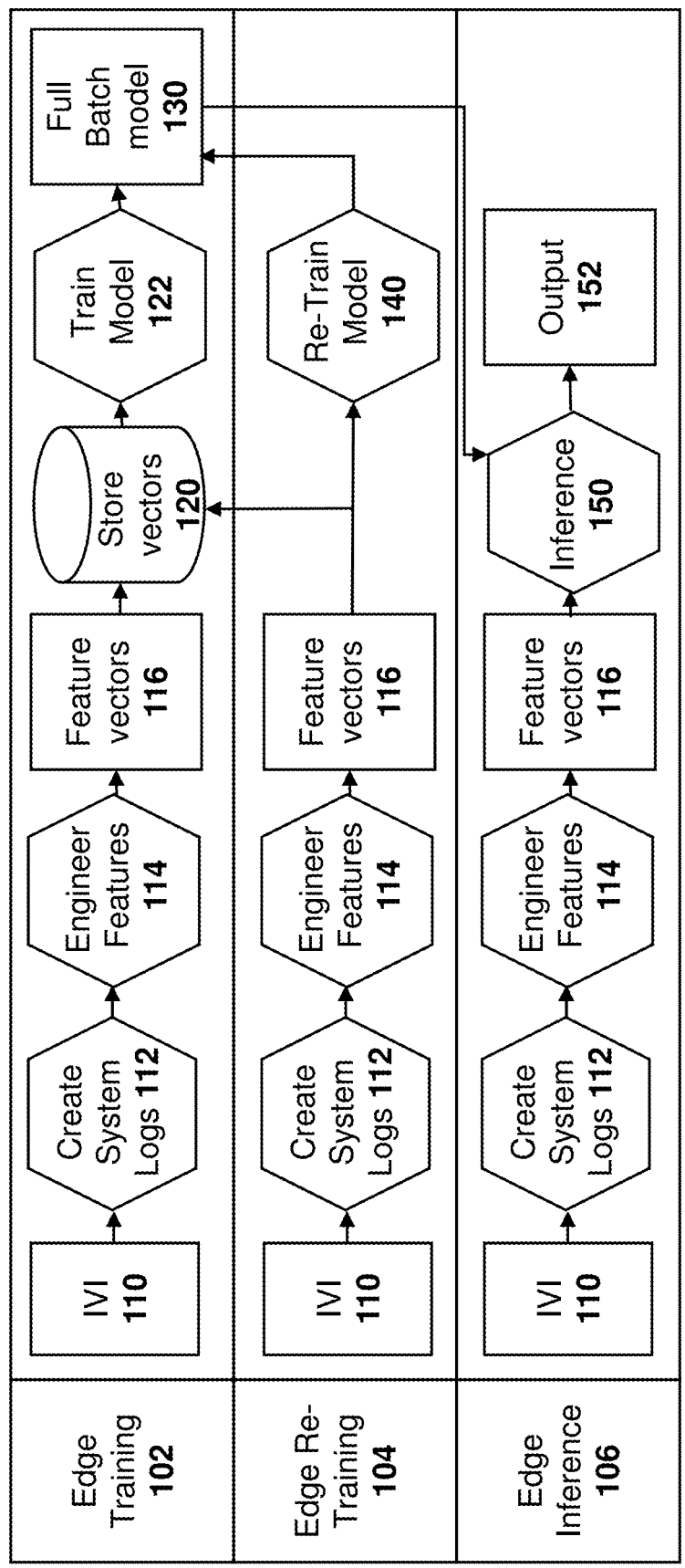
FIG. 1 is a block diagram showing the processing and storage for a full batch anomaly detection system where the processing and storage is done at an edge device.

The present disclosure provides a method at a computing device for anomaly detection, the method comprising: storing, at the computing device, a full batch model for a plurality of data points, wherein each of the plurality of data points is associated with one of a plurality of clusters, and wherein the storing comprises a table for storing information about the plurality of clusters without storing the plurality of data points; receiving a new data point from a hardware sensor; determining that the new data point falls outside the full batch model, thereby detecting an anomaly; and performing an action based on the anomaly.

The present disclosure further provides a computing device for anomaly detection, the computing device comprising: a processor; and a communications subsystem, wherein the computing device is configured to: store a full batch model for a plurality of data points, wherein each of the plurality of data points is associated with one of a plurality of clusters, and wherein the storing comprises a table for storing information about the plurality of clusters without storing the plurality of data points; receive a new data point from a hardware sensor; determine that the new data point falls outside the full batch model, thereby detecting an anomaly; and perform an action based on the anomaly.

The present disclosure further provides a computer storage medium for storing instruction code for anomaly detection, which, when executed by a processor on a computing device, cause the computing device to: store a full batch model for a plurality of data points, wherein each of the plurality of data points is associated with one of a plurality of clusters, and wherein the storing comprises a table for storing information about the plurality of clusters without storing the plurality of data points; receive a new data point from a hardware sensor; determine that the new data point falls outside the full batch model, thereby detecting an anomaly; and perform an action based on the anomaly.

The present disclosure is directed to Internet of Things devices. For example, such devices may include automotive systems. However, the methods and systems described herein could equally be used in other systems. Therefore, the techniques of present disclosure are not limited to any particular system.

In some cases, software programs may execute in systems connected to, or accessible via, public networks such as the Internet. Malicious actors can use various exploitative techniques to influence the behavior of a network-connected software program. In other cases, malicious actors with access to the system may insert malicious code into the system software to influence the behavior of the software.

Specifically, as the proliferation of Internet of Things (IOT) devices continues to increase, so does the threat surface that attackers can target for nefarious purposes. While protection based mechanisms can guard against the inception of an intrusion, if such methods fail, it may be beneficial to have a way to detect anomalous behavior on endpoint to prompt action to protect the end point, business or user from harm.

For example, a modern vehicle may have over 100 million lines of software code. As software in a vehicle grows, so does an attack surface, which makes such software vulnerable to attacks. Each poorly constructed piece of software represents a potential vulnerability that can be exploited by attackers.

The "castle walls" used to keep hackers out of the system may be insufficient, or may be circumvented by the malicious actors over time. A system may not be able to detect compromised devices in some cases.

In this regard, methods and systems are provided which may analyze data such as logs within a system to detect anomalies. Such system may use machine learning to find data anomalies.

Further, on edge systems such as vehicles, limitations in memory, communication, and processing may exist. For example, IoT devices do not typically optimize for hard drive space, meaning the ability to store data may be limited. Further, IoT devices often have limited processing power and not all IoT devices will readily be able to connect to the cloud at all times.

A further factor that can cause issues with analysis of logs is that IoT devices may have varied behaviors. In particular, depending on how the user uses the IoT device, or how it is configured in a system, the normal behavior may look different between similar IoT devices.

As used herein, edge devices and IoT devices are used interchangeably.

Current anomaly detection systems may use "Full Batch Model" algorithms. Such models refer to anomaly detection systems that need to train on all data at once and examples may include One Class SVM, Isolation Forest, Local Outlier Factor, among others. Such models require all benign data to be stored for processing. In this regard, a significant amount of storage space would be required at the edge IoT device, which may not exist.

Specifically, reference is made to FIG. 1, which shows the steps required during edge training 102, edge retraining 104 and edge inference 106, where the full batch model is located on the edge device.

The example of FIG. 1 uses an in vehicle infotainment system (IVI) 110 as an example edge device. However, such device is merely provided for illustration purposes and the present disclosure is not limited to in vehicle infotainment systems.

IVI 110 creates system logs 112 and, from the system logs, engineers features 114.

Such features are converted to feature vectors at block 116. This occurs for all of edge training 102, edge retraining 104 and edge inference 106.

For edge training 102 and edge retraining 104, the edge device needs to store the vectors at block 120. This is done to eventually cluster on the aggregate. For an edge device, the requirement to store the vectors on the edge device may lead to an infeasible solution if the desired disk allocation is too small. This may be exacerbated if the model needs to be retrained. For example, if a new software update is provided to the edge device, a new application is installed, among other factors, the storage problem is added to.

From the stored vectors, the model is trained at block 122. The model may need to be trained on all available benign data. With some full batch models such as One Class SVM, this may take a long time, and may take many resources to train. In some cases, the model may not be able to train an entire data set without failing. Other models such as Isolation Forest may not suffer from this, but they typically suffer from efficacy compared to one class SVM.

From the training at block 122 a full batch model 130 may be created. Similarly, for the edge retraining 104, a retrained model 140 may be used to create the updated full batch model 130.

The full batch model 130 may then be used during inference, shown at block 150 which may then generate an output 152.

Full batch models typically cannot incrementally train the model, but instead may need to start from scratch, which may take more resources than an edge device may have.

Figure 2:
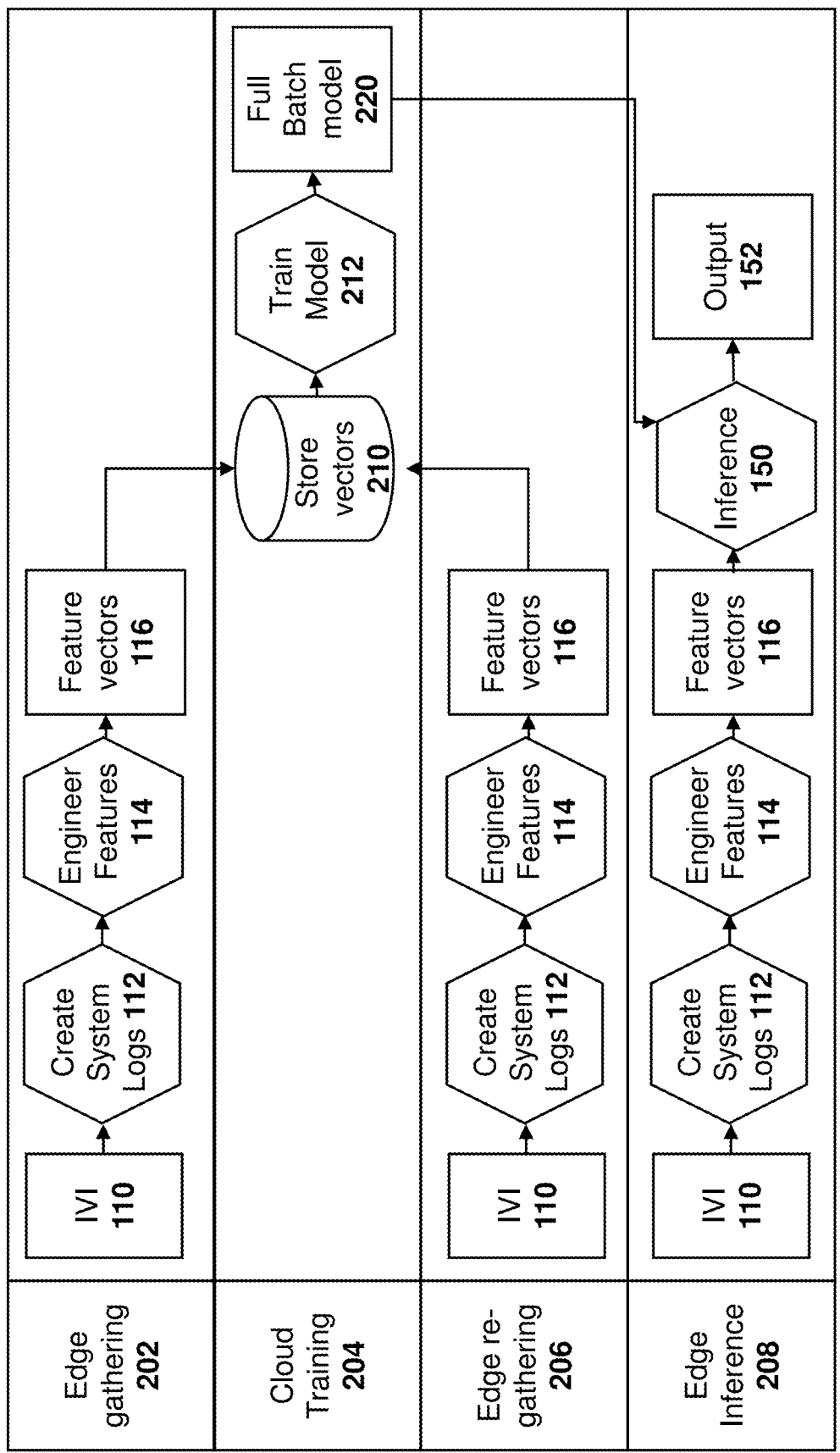
FIG. 2 is a block diagram showing the processing and storage for a full batch anomaly detection system where the processing and storage is done at a cloud device.

Therefore, in accordance with the embodiment of FIG. 1, one of the main issues is the space limitation on the edge device. In this regard an alternative approach would be if the storage and processing was moved to a cloud solution. Reference is now made to FIG. 2.

Specifically, the edge device could send a constant stream of log data to be analyzed to a cloud server or service, but this may overwhelm the communications channels from the edge device and thus be too expensive to implement.

In the case of FIG. 2, four processes are shown, specifically edge gathering 202 which occurs on the edge device, cloud training 204 which occurs in the cloud, edge re-gathering 206 which occurs on the edge device and edge inference 208 which occurs on the edge device (with input from the cloud).

As with the embodiment of FIG. 1, on the edge device IVI 110 creates system logs 112 and, from the system logs, engineers features 114.

Such features are converted to feature vectors at block 116. This occurs for all of edge gathering 202, edge re-gathering 206 and edge inference 208.

For edge gathering 202 and edge re-gathering 206, the edge device provides the vectors to the cloud for cloud storage at block 210.

From the stored vectors, the model is trained at block 212. Further, from the training at block 212, a full batch model 220 may be created at the cloud.

The full batch model 220 may then be used during inference, shown at block 150 which may then generate an output 152.

While the embodiment of FIG. 2 remediates the problem of storing too much data at an edge device, this has been traded for the cost of interacting with the cloud. Specifically, edge devices can be capable of generating thousands of records each second. While some filtering, aggregation, among other factors, may be applied, this will result in a significant amount of bandwidth per end point. Such communication costs may be further be compounded by the number of end points expected to be transmitting data.

Further, for the retraining during the edge re-gathering 206, more data needs to be sent to the cloud, having the same problems as above.

Thus, for both training and retraining, the costs for training in the cloud may be prohibitive given the amount of data needed to train.

Further, once the model is trained, the model then needs to send data back to the end point for inference, which is both data heavy and may also increase the latency time for inference, potentially making it too late to take action on the inference in some cases. Specifically, the communication with the cloud adds latency for each roundtrip and further requires a component with Internet connectivity to the cloud and back. If an attacker is able to take an endpoint offline, the anomaly detection function will cease to work.

Figure 3:
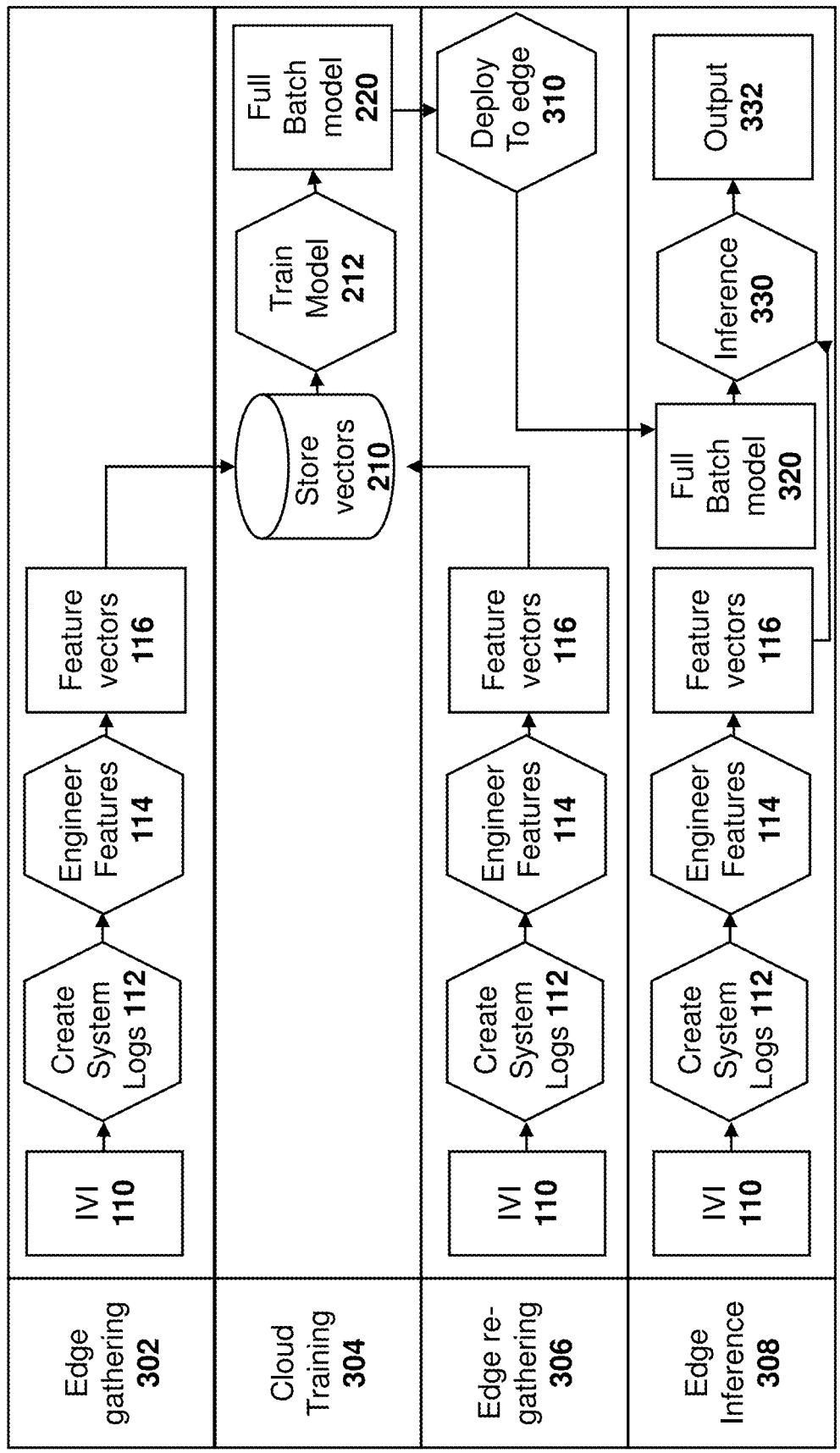
FIG. 3 is a block diagram showing the processing and storage for a full batch anomaly detection system where the processing and storage is done at an cloud device and the full batch model is pushed to an edge device.

Based on the above, another approach for edge devices is to move the full batch model to the edge once training is completed. Reference is now made to FIG. 3.

In the case of FIG. 3, four processes are shown, specifically edge gathering 302 which occurs on the edge device, cloud training 304 which occurs in the cloud, edge re-gathering 306 which occurs on the edge device and edge inference 308 which occurs on the edge device.

As with the embodiment of FIGS. 1 and 2, on the edge device IVI 110 creates system logs 112 and, from the system logs, engineers features 114.

Such features are converted to feature vectors at block 116. This occurs for all of edge gathering 302, edge re-gathering 306 and edge inference 308.

For edge gathering 302 and edge re-gathering 306, the edge device provides the vectors to the cloud for cloud storage at block 210.

From the stored vectors, the model is trained at block 212. Further, from the training at block 212, a full batch model 220 may be created at the cloud.

The full batch model 220 may then be deployed to the edge, shown with block 310, which may then create a full batch model 320 which may used during inference, shown at block 330, which may then generate an output 332.

While the embodiment of FIG. 3 reduces the ability to stop anomaly detection mechanisms by turning off the Internet connectivity during inference, there are still areas of concern with this approach. Specifically, there is still the issue of sending a significant amount of data from the end point to the cloud, which may be prohibitive in terms of communication functionality and costs. Further, retraining suffers from the same issues as the embodiment of FIG. 2. End training also faces the same limitations for all full batch models.

Therefore, the present disclosure provides an incremental centroid clustering method and system for anomaly detection on complex systems.

Vehicle Software System

While the incremental centroid clustering methods and systems of the present disclosure could be used on any computing system, such as any Internet of Things system, in one embodiment it may be used within a vehicle system. However, the present disclosure is not limited to vehicle systems, and a vehicle system is provided herein merely for illustration purposes.

Figure 4:
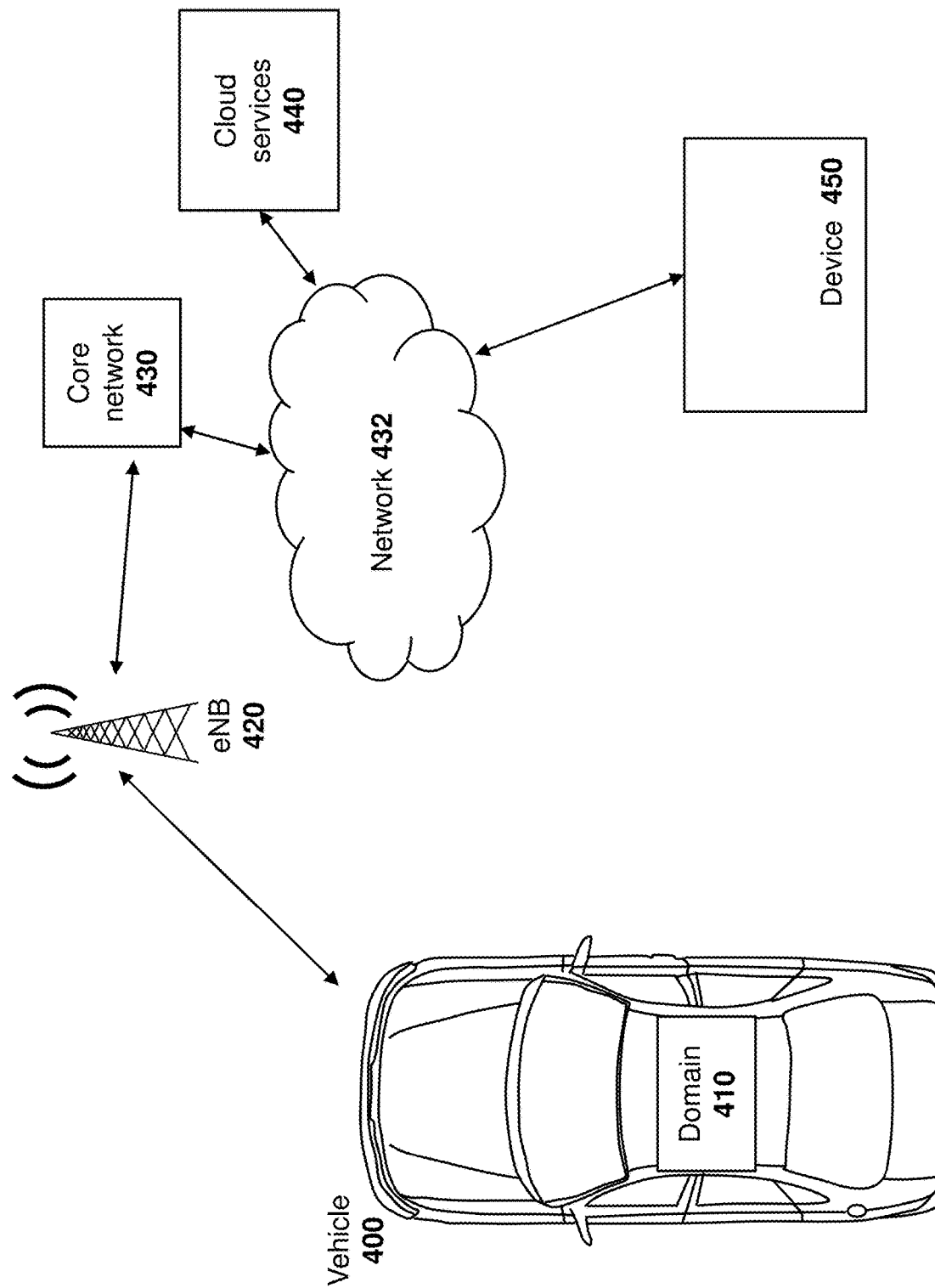
FIG. 4 is a block diagram showing an example vehicle system.

Reference is now made to FIG. 4, which shows an example vehicle system.

In the embodiment of FIG. 4, a vehicle 400 may be equipped with a computing system and a communications system. Part of the computing system may include a domain 410, which may have applications that create log data. Further, part of the computing system on vehicle 400 perform anomaly detection as described below.

In the example of FIG. 4, vehicle 400 communicates utilizing a communications system with a cellular base station, shown in FIG. 4 as eNB 420. The base station may communicate with a core network 430 which may then forward communications through a network 432 to a cloud services provider 440. Network 432 may, for example, be a wide area network such as the Internet.

In other embodiments, rather than a core network 430, any technology associated with a particular cellular or wireless communications protocol may be used.

In some embodiments, cloud services 440 may provide processing for a domain, or may provide information used within a domain.

Further, rather than a vehicle, a device 460 may be used for anomaly detection. Device 460 may be any computing device, and could include Internet of Things devices, mobile devices, medical equipment, vehicles or equipment associated with vehicles, among other options. Device 460 may communicate through network 432 utilizing various wired or wireless technologies, including but not limited to Ethernet, fiber, cellular, Wi-Fi, satellite, among other options.

In the embodiment of FIG. 4, domain 410 on vehicle 400 and device 450 may be considered edge devices, and have limited storage and/or processing in some cases.

Incremental Centroid Clustering

As indicated above, the use of existing machine learning models on an edge device is impractical. In particular, when analyzing log or tabular data, utilizing existing machine learning anomaly detection algorithms, the main issue is that there is not enough space to store the information needed for such algorithm, there is not enough processing to create the full batch model and/or there is not enough communication capabilities to provide all the data to the cloud. Further, the data is needed upfront and is difficult to incrementally update.

In this regard, an algorithm is described in the present disclosure for incremental centroid clustering. As described in detail below, a first data point would be used to create a cluster and subsequent points will then be analyzed to determine they are within a threshold distance of the average distance all points are to each other within that cluster. If so, the new data point is added to the cluster and the cluster shape is adjusted based on the new addition. Otherwise, a new cluster is formed.

Further, in some embodiments the number of clusters may be limited to be proportional to the number of points processed so that inference times do not get too expensive. In this case, small clusters such as those of size 1 which are typically outliers may be removed on occasion if a desired maximum cluster proportion threshold is passed. When this occurs, the threshold may be increased by a threshold adjustment factor to promote less new clusters being created.

Once the model has been trained, anything predicted within a threshold distance of an existing cluster is considered as benign and otherwise is considered anomalous.

In the incremental centroid clustering model, the only data being stored are the clusters which are a function of the square root of the number of points processed at maximum, or each cluster contains a single vector including all information for the algorithm to work.

Further, incremental centroid clustering is incremental. As opposed to requiring all the data to perform clustering, incremental centroid clustering can cluster one data point at a time.

As described below, the efficacy of such algorithm was tested compared to other machine learning models and was found to be close to or better than the best full batch algorithms tested.

Figure 5:
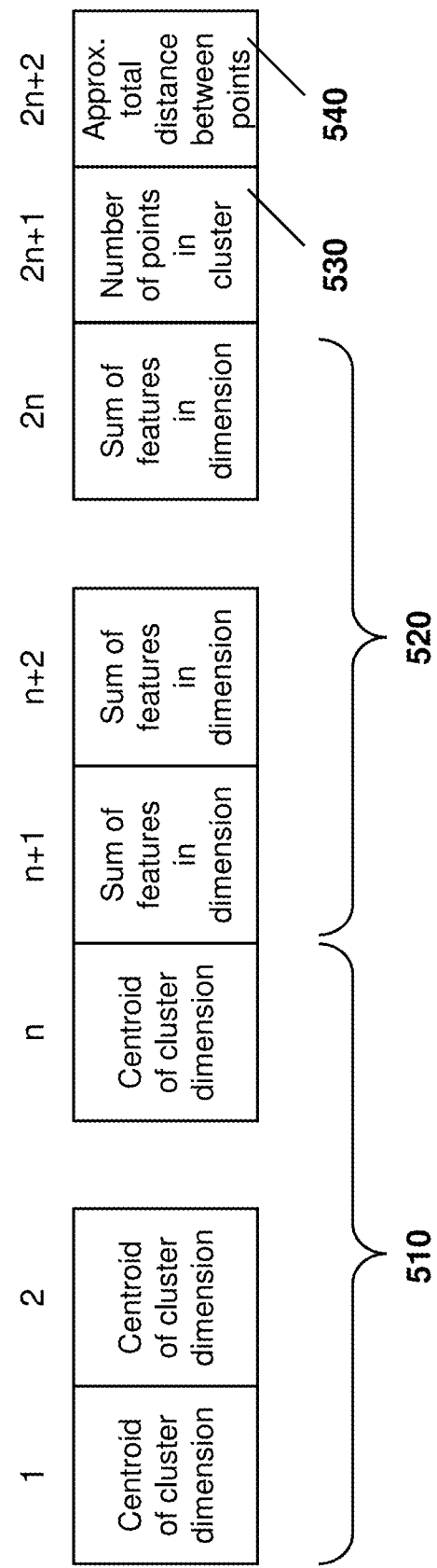
FIG. 5 is a block diagram showing an example data structure for storing incremental centroid cluster information.

Reference is now made to FIG. 5. The embodiment of FIG. 5 shows an example of a data structure for storing information about a cluster. However, the example of FIG. 5 is merely one option for storing such information. The information stored in the example data structure is illustrative of the type of information that may be stored for a cluster.

In the example of the FIG. 5, a system having a plurality of clusters may be represented in a table in which each row has the information about one cluster. The information may comprise data about the centroid of the cluster for a particular dimension or feature for which the information is being processed. In the example of FIG. 5, "n" dimensions or features are being processed, and therefore columns 1 to n comprise data on the centroid for the cluster for that particular dimension or feature. Collectively these columns are shown in FIG. 5 as columns 510.

The next n columns store a value providing the sum of all features across all points belonging to the cluster. In particular, as described in more detail below, columns n+1 to 2n, represented as columns 520, provide the sum of the features cumulatively for the cluster for each of the dimensions or features being analyzed.

Column 530 provides a number of points in a cluster. In other words, the number of data points that have been analyzed and stored in that cluster are represented by column 530.

Column 540 provides an approximate total distance between the points in the cluster. In other words, a distance measurement between data points can be updated as new data points are added to the cluster.

Figure 6:
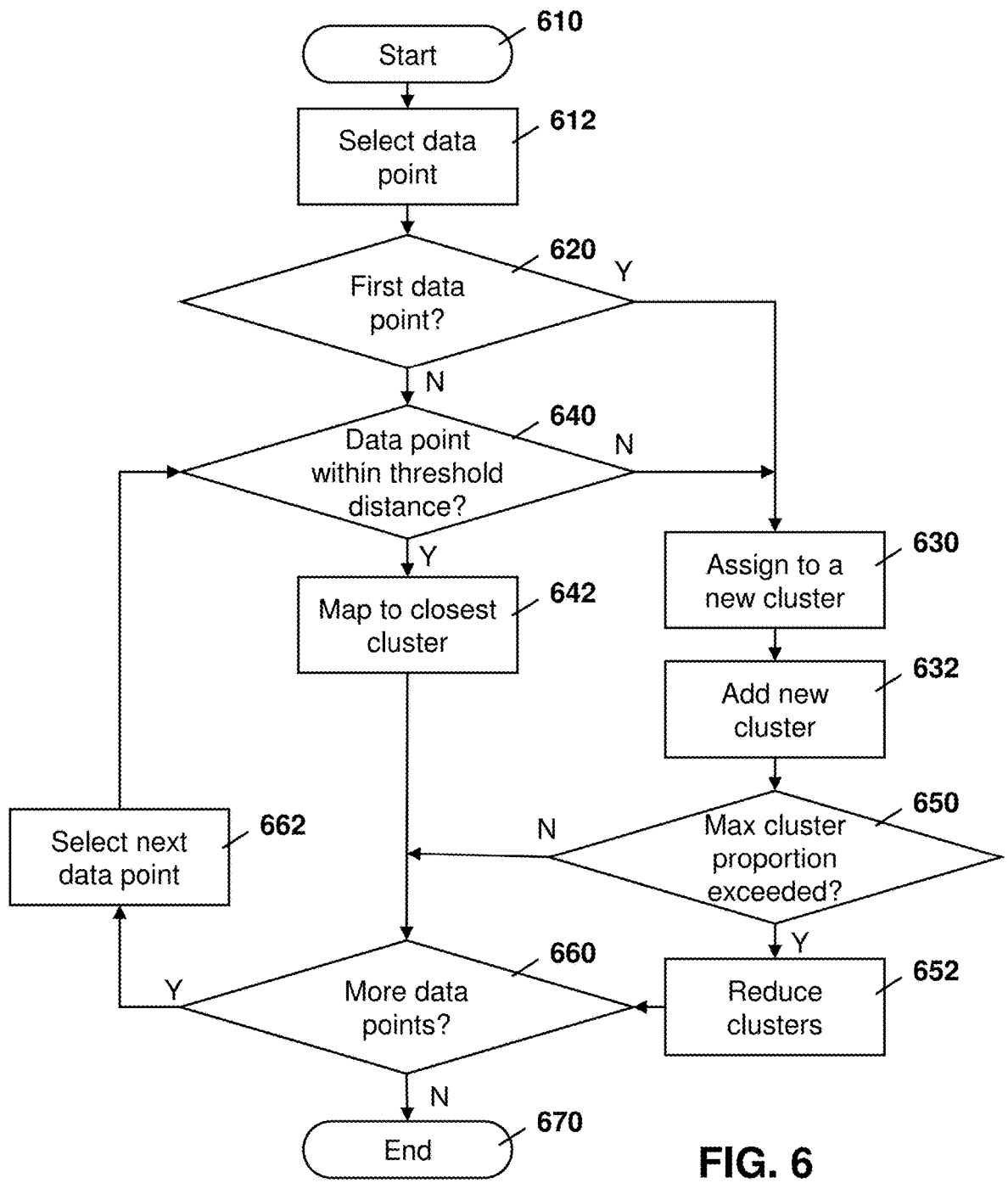
FIG. 6 is a process diagram showing a process for training for an incremental centroid cluster model.

The data structure of FIG. 5 or similar data structure can be used in training an incremental centroid clustering algorithm in accordance with the embodiment of FIG. 6.

In particular, the process of FIG. 6 starts at block 610 and proceeds to block 612 in which a data point is selected. As will be appreciated by those in the art, the data point selection may involve using a line in a log file, processing data as the data is created, using the feature vectors as described in FIGS. 1 to 3 above, among other options. In some cases, the data point represents data from a sensor, such as a vehicle sensor, or a group of sensors from a vehicle. In some cases the data point may be received directly from the sensor, Electronic control unit (ECU) or other computing unit to be processed. In some cases, the data from the sensors or ECUs may be stored in a log file and may have some processing performed ahead of time. Other options are possible.

From block 612 the process proceeds to block 620 in which a check is made to determine whether the selected data point from block 612 is the first data point for the incremental centroid clustering algorithm. If yes, the process proceeds to block 630 in which the data point is assigned to a new cluster. In particular, the values for columns 510 in FIG. 5 correspond to the n features or dimensions being analyzed for the data point being passed into the algorithm.

Further, columns 520 are populated with the values corresponding to the n features of the data point being processed. This is because the sum of the features in the dimension would have only the one data point and therefore the sum is the original value.

Column 530 is assigned a value of 1, indicating a single data point.

Column 540 is assigned a value of 0, indicating that there is no distance currently between the data points in the cluster. Specifically, as there is only the one data point, the distance between data points is 0.

Referring again to FIG. 6, from block 630 the process proceeds to block 632 in which the new cluster is added to the table for the system.

Conversely, from block 620, if the data point is not the first data point for the system, the process proceeds to block 640 in which a check is made to determine whether the data point is within a threshold of the average distance to a cluster center of any existing cluster in the system.

The average distance to a cluster center starts at zero. To start to build clusters, a global variable, referred to herein as "Cluster Distance" may be used, which monitors the distance from the new point to the closest cluster. At each iteration past the first data point, the distance between the new data point and the closest cluster is added to this variable, starting at 0.

A second variable, referred to herein as "Count" may indicate the total number of data points saved to a system.

The check at block 640 multiplies the "threshold distance" by the value of "Cluster Distance" divided by "Count". In this way, "Cluster Distance" divided by "count" is meant to represent the average distance of each point to the nearest cluster. This is useful since a good choice for the "threshold distance" hyperparameter may be difficult to determine ahead of time and the condition may be more flexible if clusters are becoming more or less dense over time.

Such global variables may in some cases be used for all training. In other cases, the global variables may be used until a cluster has enough points in it. After this, the check at block 640 may then multiply the "threshold distance" by the value of column 540, divided by the count at column 530. Specifically, the value of column 540 divided by the value at column 530 is meant to represent the average distance of each point to its cluster center.

In other words, the check at block 640 finds if the data point is within a threshold distance of the average distance of the average distance of points to their nearest cluster.

In some cases, the threshold distance could be a value assigned for the system, which may be adjusted in some cases as described below. Further, in some embodiments the distance being used is a Euclidean distance.

If it is determined at block 640 that the data point is not within a threshold of the average distance to a cluster center, the process proceeds to block 630 in which the data point is assigned to a new cluster, and then to block 632 in which the new cluster is added to the system.

Conversely, if it is determined at block 640 that the data point is within a threshold of the average distance to a cluster center, the process proceeds to block 642 in which the data point is mapped to the closest cluster. In particular, the mapping may be done in accordance with the embodiment of FIG. 7.

Figure 7:
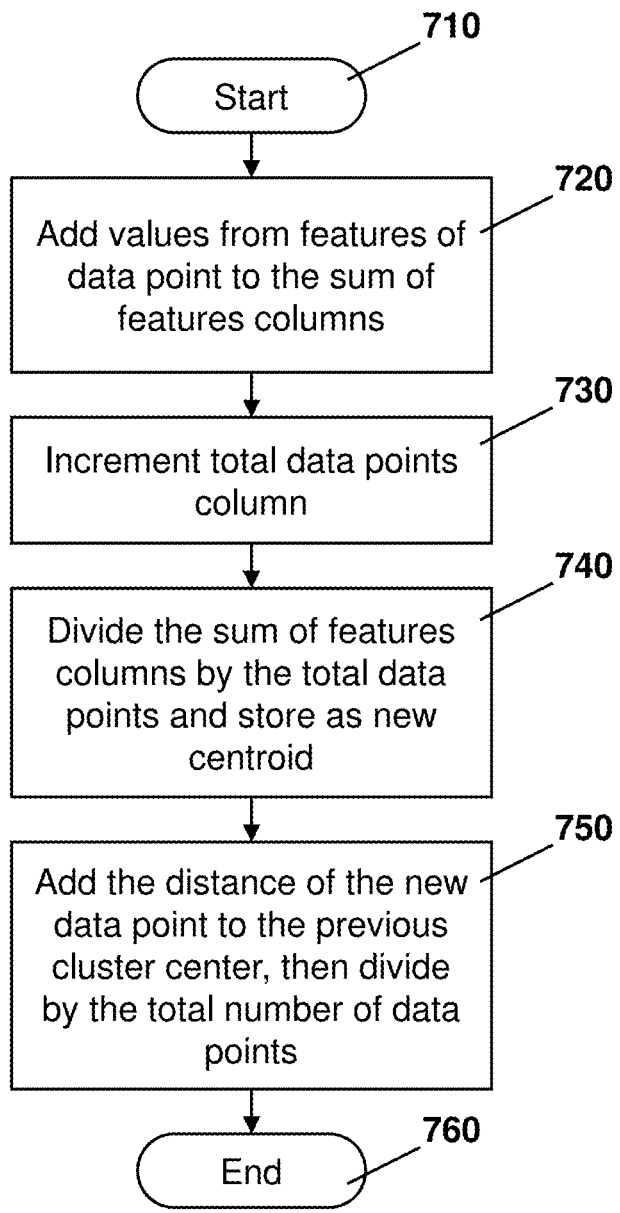
FIG. 7 is a process diagram showing a process for adding a data point to a cluster.

Referring to FIG. 7, the process starts at block 710 and proceeds to block 720 in which the values for the new data point being mapped to the cluster are calculated and added to the sum of features columns 520. This new sum is then stored in columns 520.

The process next proceeds to block 730 in which the value in column 530 is incremented by one, indicating that the cluster now has an additional data point.

The process next proceeds to block 740 in which the sum of features values stored at block 720 are divided by the total number of data points stored at block 730. These values are then stored in columns 510 as the centroid values.

The process then proceeds to block 750 in which the distance values of the new data point is added to the previous cluster center. These values can then be divided by the total number of data points stored at block 730 and then averaged to create an approximation for the average distance between all points to the cluster center, which can then be stored in column 540.

Referring again to FIG. 6, the columns representing a cluster can thus be updated with a new data point at block 642.

From block 632, if new clusters are being added, in one optional embodiment a check can be made to see if the maximum cluster count exceeds a predetermined threshold when compared with the total number of data points. In particular, a hyperparameter for the machine learning incremental centroid clustering algorithm can be set, indicating a maximum cluster proportion. In one embodiment, if the total number of clusters exceeds a function of the square root below the total points processed, then the check at block 650 is true.

From block 650, if the check is true, the process proceeds to block 652 in which the number of clusters may be reduced. In some cases, the number of clusters may be reduced by removing all clusters of size 1, for example, as these indicate outliers.

Further, in order to mitigate future growth in the number of clusters having size one, the hyperparameter dealing with the threshold distance can be increased. Specifically, the threshold distance used for the check at block 640 can be increased by an amount to allow data points to be located within clusters at a higher distance.

The increase in the threshold may in some case be by some pre-set factor, for example designated as a Threshold Adjustment hyperparameter. In some cases the increase can be based on an enumerated list of increases. In some cases, the increase may be based on some function of the size of the data set or the number of data points processed. Other options for the increase size are possible.

From blocks 642, 652, or block 650 if the maximum cluster proportion is not exceeded, the process proceeds to block 660 in which a check is made to determine whether there are more data points to process. If yes, the process proceeds to block 662 in which a next data point is selected and the process then proceeds back to block 640.

Conversely, if there are no further data points to analyze, the process proceeds to block 670 and ends.

Therefore, the process of FIG. 6 shows training steps for an incremental centroid clustering algorithm. Once training is completed, during inference, a data point may be analyzed and it may be found to belong to a cluster if it is within the distance threshold of any of the existing clusters in the model. In this case, the data point would be considered benign. Conversely, if the data point does not belong to a cluster, it would be considered anomalous.

Utilizing the processes of FIGS. 6 and 7, for disk usage, the only component that needs to be saved to the disk is the incremental model, and no other data for the incremental centroid clustering needs to be stored.

Further, the incremental centroid clustering model may process one record at a time, keeping its peak resource requirements as low as feasible.

Further, the embodiments of FIGS. 6 and 7 require no cloud connectivity, as all training and inference occurs on the edge device.

Further, a separate model may be trained for each edge device.

Figure 8:
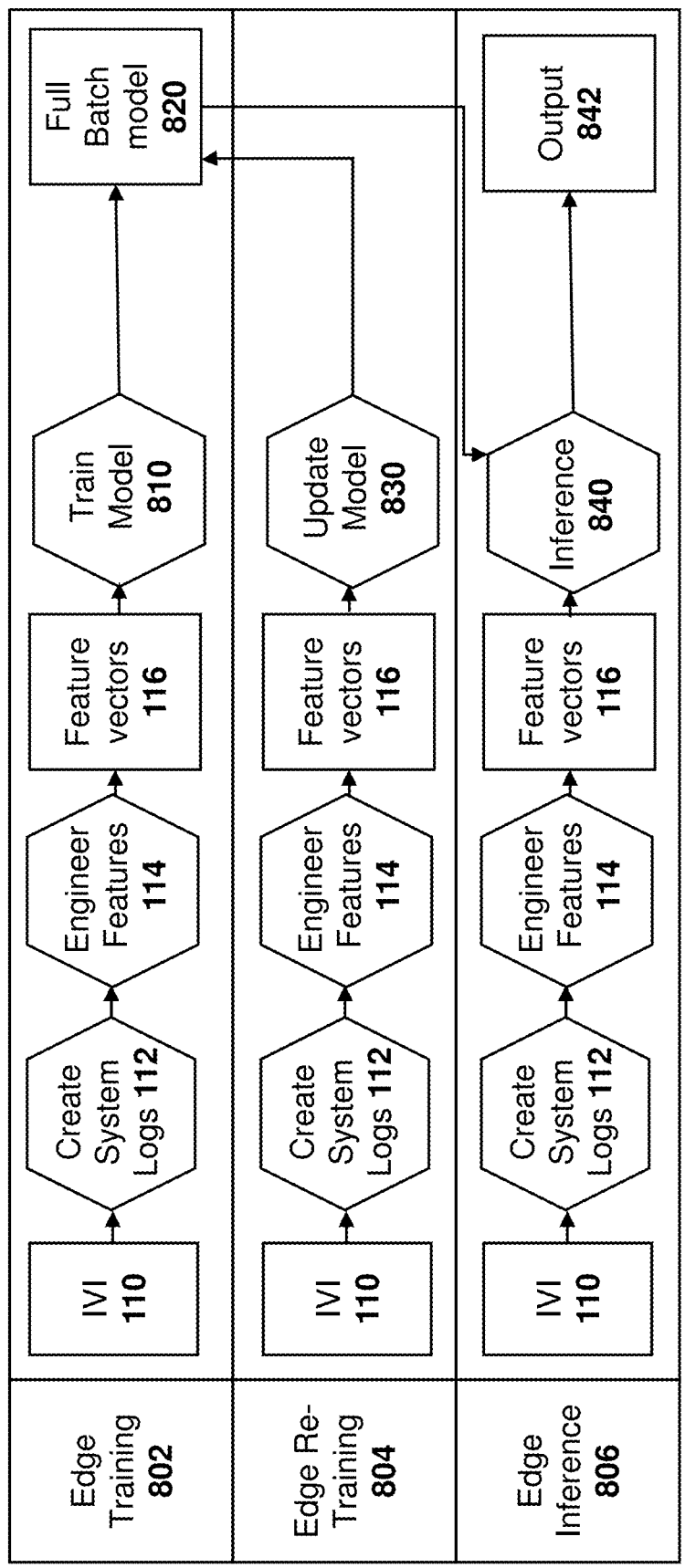
FIG. 8 is a block diagram showing the processing and storage for an incremental centroid clustering model for anomaly detection, where the processing and storage is done at an edge device.

For example, referring to FIG. 8, three processes are shown, referred to as edge training 802, edge retraining 804 and edge inference 806, all of which occur at the edge device.

The example of FIG. 8 uses an in vehicle infotainment system (IVI) 110 as an example edge device. However, such device is merely provided for illustration purposes and the present disclosure is not limited to in vehicle infotainment systems.

IVI 110 creates system logs 112 and, from the system logs, engineers features 114.

Such features are converted to feature vectors at block 116. This occurs for all of edge training 802, edge retraining 804 and edge inference 806.

Each record can then be incrementally processed, so no storage as shown in FIG. 1 is required. Instead, the feature vectors 116 may be used to train the model, as shown at block 810, or update the model, as shown at block 830. The trained or updated model can be stored (as the table of FIG. 5) for the full batch model 820.

The full batch model 820 may then be used during inference, shown at block 840, which may then generate an output 842.

Therefore, in accordance with the embodiment of FIG. 8, the limitations of full batch models are mitigated.

Further, in the case where end points will likely have very similar benign behavior, incremental models can be federated to the devices, and model updates can be applied to tailor to any behavior of that endpoint. further comma as the models do not need to train from scratch, they can update an existing model with any new behavior observed.

Testing

Figure 9:
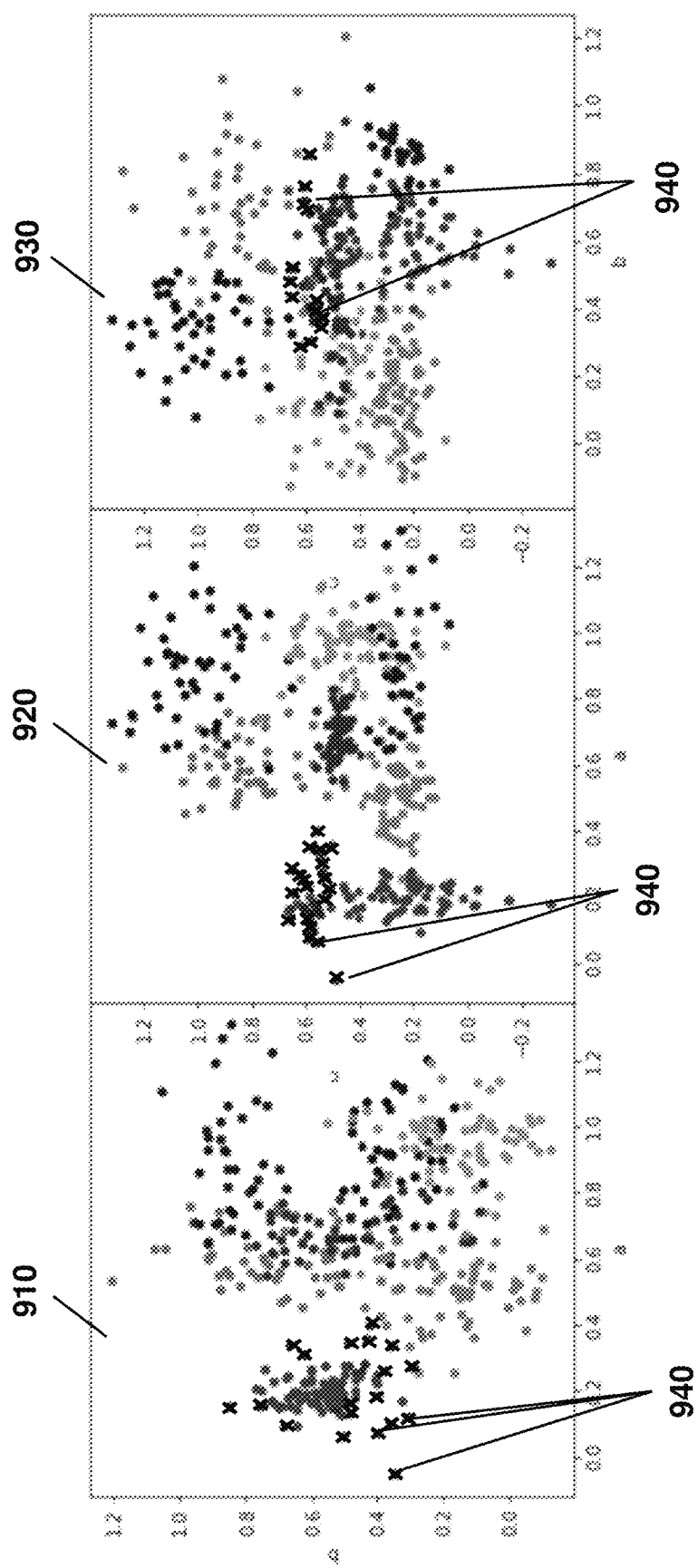
FIG. 9 is a graph showing eight example clusters being processed in three dimensions.

For testing, the process of FIG. 6 was used on a data set having 8 clusters with three-dimensional features, shown in the embodiment of FIG. 9. In particular, the embodiment of FIG. 9 shows the eight clusters in grayscale, where graph 910, graph 920 and graph 930 are the same eight clusters shown with rotation along one of the three axes.

In the test case, the cluster shown partially with reference 940 (the points in the cluster are shown with "x") was designated as anomalous behavior and the remaining seven clusters were designated as benign behavior. Therefore, the process of FIG. 6 was run as the training model on the benign behavior.

Figure 10:
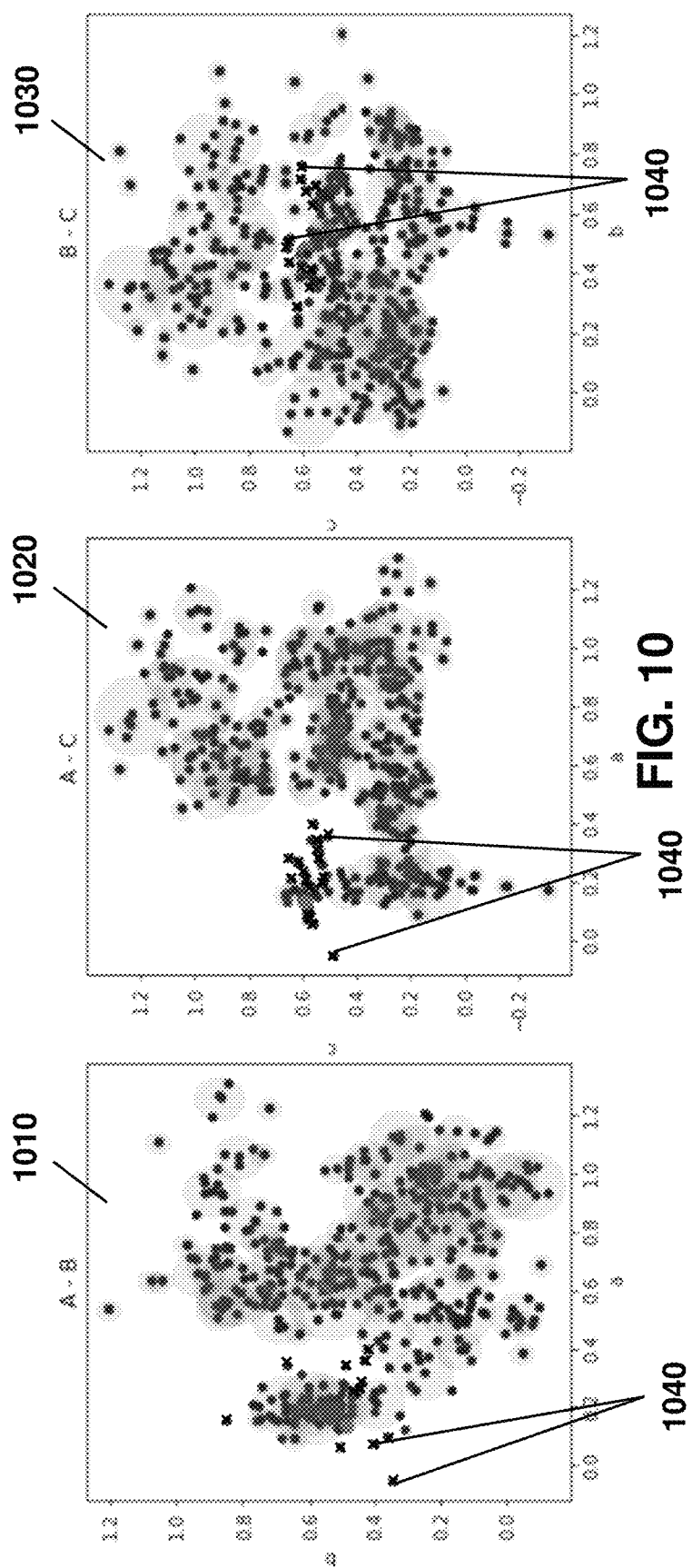
FIG. 10 is a graph showing the clustering of benign data points and the identification of anomalies from the plot of FIG. 9.

The inference process was then run on the remaining data points. In this case, the graphs of FIG. 10 were created, where graphs 1010, 1020 and 1030 show the same clusters rotated along one of the axes the different dimensions. In particular, as seen in FIG. 10, many overlapping clusters cover benign activity, but visually the anomalous behavior, shown with an "x" symbol, and designated generally with reference numeral 1040, is mostly untouched.

Figures 11, 12:
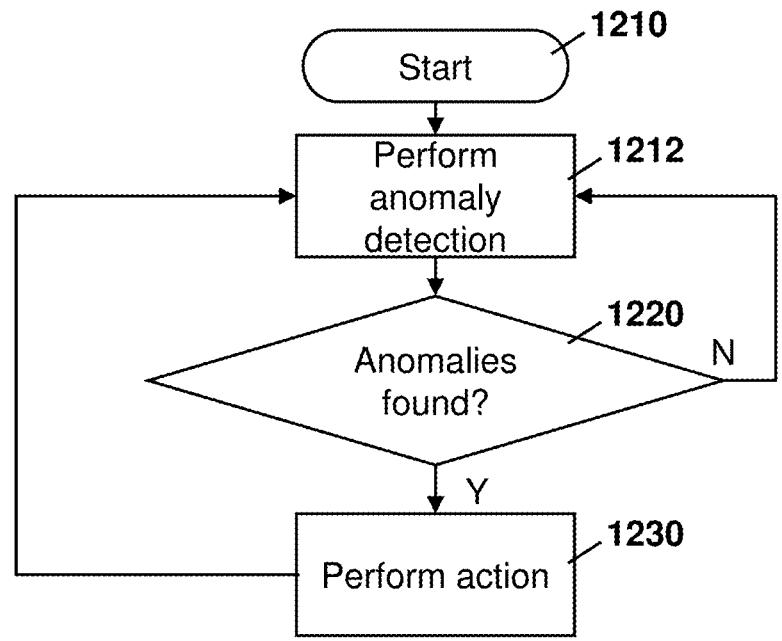
FIG. 11 is a block diagram of an example confusion matrix.
FIG. 12 is a process diagram for performing an action on detection of an anomaly.

The process can be evaluated based on a confusion matrix, such as that shown with regard to FIG. 11. In particular, as seen in FIG. 11, the matrix compares the prediction results with the actual results. If both the prediction and actual value for a data point is that the data point is benign, this is classified as a true positive 1110.

If the prediction is that the data point is anomalous, but the actual value for the data point is that the data point is benign, this is classified as a false negative 1120.

If the prediction is that the data point is benign, but the actual value for the data point is that the data point is anomalous, this is classified as a false positive 1130.

If both the prediction and actual value for a data point is that the data point is anomalous, this is classified as a true negative 1140.

Based on the confusion matrix of FIG. 11, a system goal is the maximizing of the true positive 1110 and true negative 1140 values, while minimizing the false negative 1120 and false positive 1130.

For the example of FIGS. 5 and 6, the confusion matrix was found to be:

TABLE 1

Confusion matrix for test case

|  | Number |
|---|---|
| True Positive | 375 |
| False Negative | 2 |

TABLE 1-continued

Confusion matrix for test case

|  | Number |
| --- | --- |
| False Positive | 3 |
| True Negative | 30 |

Thus, from Table 1, precision for the benign data points was 99.2% and the precision for the anomalous data points was 93.3%.

Further, the recall for the test, specifically out of the total positive, what percentage are predicted positive, is 99.5% for the benign data points and 90.9% for the anomalous data points.

The F1 score for the test takes both false positives and false negatives into account and is the harmonic mean of precision and recall. It can be represented as equation 1 below:

$$F1\ score = \frac{2}{\frac{1}{Precision} + \frac{1}{Recall}} \quad (1)$$

The F1 score for the benign data points is 99.3 and for the anomalous data points is 92.3.

Therefore, the general accuracy of the test was 98.8% and the harmonic F1 score was 95.7, indicating that classification efficacy was high.

Thus, the model can be used on computing devices having limited storage and/or processing with high efficacy. The only storage needed is with regard to the table for the plurality of clusters. In particular, the only data being stored are the clusters which are a function of the square root of the number of points processed at maximum, or each cluster contains a single vector including all information for the process to work.

The processing can be assisted by the paring down of the number of clusters when the cluster proportion exceeds a threshold and then by increasing the size of the distance threshold used. This further assists in tuning the parameters of the algorithm.

The process is incremental and does not require all the data to perform a clustering. In particular, the method can cluster one data point at a time.

Comparison

In testing, the efficacy of the incremental centroid clustering of the present disclosure has been found to be close to or better than the best of the full batch algorithms tested.

Specifically, in further testing to that described above, the incremental centroid clustering model was tested against a One Class SVM model. The same training data, validation data and testing data were used. The training data was used to train each model. The validation data was used to find the best choice of hyperparameters that resulted in the proper separation of the anomaly detection and the test data was used to compare the results.

For the one class SVM model, the following hyperparameters were tuned:

TABLE 2

Hyperparameters for One Class SVM

| Hyperparameter | Values |
| --- | --- |
| Kernel (specifies the kernel type to be used) | ['linear', 'poly', 'rbf', 'sigmoid'] |
| Degree (the degree of the polynomial kernel if selected) | [3, 4, 5] |
| Nu (can be considered the contamination factor) | [0.001, 0.01, 0.05, 0.1, 0.2, 0.3, 0.4, 0.5] |
| Gamma (kernel coefficient for 'rbf', 'poly' and 'sigmoid') | ['scale', 'auto'] |
| Tol (tolerance for stopping criterion) | [1e-2, 1e-3, 1e-4] |

For the Incremental Centroid Clustering, the following hyperparameters were tuned:

TABLE 3

Hyperparameters for Incremental Centroid Clustering

| Hyperparameter | Values |
| --- | --- |
| Threshold (the distance from the centroid proportional to the mean distance between all points in that cluster) | [0.3, 0.5, 0.7, 1] |
| Max Cluster Proportion (ensures the clusters remain a function of the sqare root below the total points processed) | [0.5, 0.6, 0.7, 0.75, 0.8, 0.85] |
| Threshold Adjustment (how much should the Threshold be increased when the number of clusters exceeds the Max Cluster Proportion) | [1.05, 1.1, 1.15, 1.2, 1.3, 1.4, 1.5] |
| Distance Threshold (Once clusters are defined and it is desired to predict how far from a centroid a point belonging to the cluster can be) | [1.5, 1.8, 2.0, 2.2, 2.5] |

Running the tests multiple times varying the hyperparameters, the best performance for the data set for One Class SVM was found for the RBF kernel, with Gamma set to 'scale', tolerance was inconsequential, and Nu set to 0.001. For this set of hyperparameters, the following confusion matrix was found:

TABLE 4

Confusion matrix for One Class SVM

|  | Number |
| --- | --- |
| True Positive | 344 |
| False Negative | 3 |
| False Positive | 12 |
| True Negative | 18 |

From the above, the precision for the benign data was 96.6 and for the anomalous data was 85.7. The recall for the benign data was 99.1 and for the anomalous data was 60.0. The F1 score for the benign data was 97.9 and for the anomalous data was 70.6.

Overall, the accuracy of the One Class SVM was 96.0, the harmonic F1 was 82.0 and the area under curve (AUC) was 79.6.

Similarly, running the tests multiple times varying the hyperparameters, the model did worse when the threshold was too low (0.3) and the cluster proportion was too high (>0.8). For this model, the following confusion matrix was found:

TABLE 5

Confusion matrix for Incremental Centroid Clustering

|  | Number |
|---|---|
| True Positive | 345 |
| False Negative | 2 |
| False Positive | 5 |
| True Negative | 25 |

From the above, the precision for the benign data was 98.6 and for the anomalous data was 92.6. The recall for the benign data was 99.4 and for the anomalous data was 83.3. The F1 score for the benign data was 99.0 and for the anomalous data was 87.7.

Overall, the accuracy of the Incremental Centroid clustering was 98.1, the harmonic F1 was 93.0 and the AUC was 91.46.

Based on these results, after tuning the Incremental Centroid clustering model fit was more accurate than One Class SVM. Further, it was found that Incremental Centroid Clustering ran faster than the One Class SVM model.

Use of Anomaly Detection

In practice, the use of anomaly detection can be done to perform various actions either at the edge device, a server, cloud and/or other computing device. Specifically, reference is now made to FIG. 12.

The embodiment of FIG. 12 starts at block 1210 and proceeds to block 1212 in which the anomaly detection is performed. In this case, the anomaly detection performed can use the full batch model created in the embodiments of FIGS. 6 and 7 described above. New data points can then be received, for example from a log file, which may be created based on input from a hardware sensor or based on a software process in some cases.

The new data point can be checked to determine whether it falls into the full batch model by determining whether the point is the distance threshold from any existing cluster in the full batch model. If yes, the data point is considered a benign data point. If no, the data point is considered an anomalous data point. This can be repeated as data points are created, based on log file contents, among other options.

Once the anomaly detection has been performed (or as it is being performed in a system performing continuous analysis), the process proceeds to block 1220 in which a check is made to determine whether any anomalies were found in the data being processed. If not, the process may proceed back to block 1212 to continue to perform anomaly detection.

Conversely, if anomalies were found at block 1220, the process may proceed to block 1230 in which an action may be performed. The action being performed may be specific to the type of application the edge device is deployed in. For example, in a vehicle system, if an anomaly is detected one possible action would be to provide an alert to the driver of the vehicle. For example, the alert may include a message on an infotainment system, on the dashboard of the vehicle, an audio alert to the driver, haptic feedback on the steering wheel, among other options. The alert may indicate that the driver should have the vehicle serviced, should pull over and stop driving the vehicle, should contact the manufacturer or dealer, should reset the system, among other options.

In other cases, the action may be an alert to a third party rather than the driver. Such alert may be sent to a vehicle manufacturer, dealer, fleet operator, business IT department, among other options. The alert may include the data that caused the anomaly, context surrounding the anomaly, other vehicle sensor readings, among other such information. This may then allow the third party to make decisions with regard to the vehicle, such as whether to cause the vehicle to be serviced, remove the vehicle from the road, reset software on the vehicle, whether a software update should be pushed to the vehicle, among other such actions.

In some cases, the action may involve the vehicle itself taking the action autonomously. For example, the vehicle may pull over if the vehicle has autonomous functionality, the vehicle may ignore anomalous sensor readings in some cases, the vehicle may be limited in speed in some cases, among other such actions.

For non-vehicle situations, the action may similarly include alerting a user, a third party, or performing some functionality on the edge device based on the anomalous data detection.

In some cases, the action may be to use the new data points in re-training the model.

The present disclosure is not meant to be limited to any particular action that may be performed based on the detection of an anomaly, and the above examples are provided for illustration only.

Computing Device

The above domains, network elements, IoT or edge devices, cloud services, nodes, and other computing platforms may be implemented using any computing device. One simplified diagram of a computing device is shown with regard to FIG. 13. The computing device of FIG. 13 could be any fixed or mobile computing device.

Figure 13:
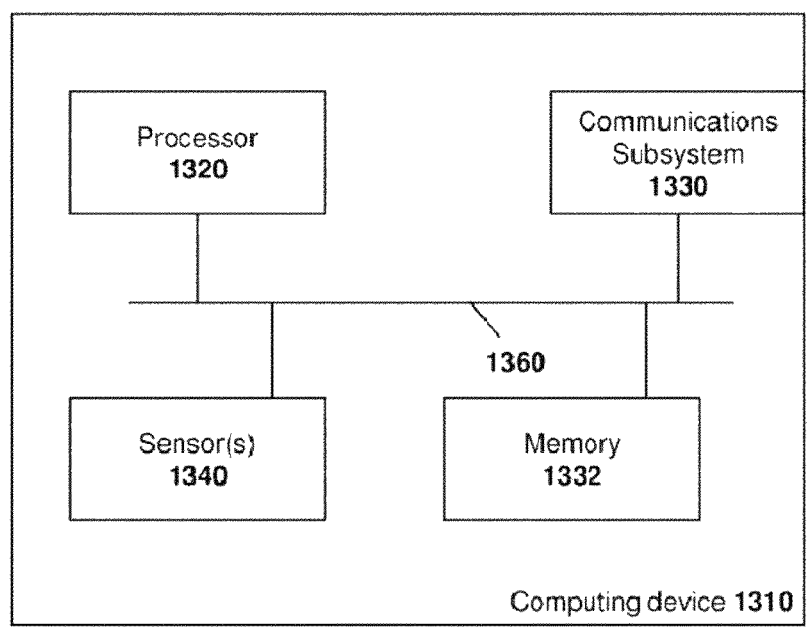
FIG. 13 is a block diagram of a simplified computing device capable of being used with the embodiments of the present disclosure.

In FIG. 13, device 1310 includes a processor 1320 and a communications subsystem 1330, where the processor 1320 and communications subsystem 1330 cooperate to perform the methods of the embodiments described above. Communications subsystem 1330 allows device 1310 to communicate with other devices or network elements and may vary based on the type of communication being performed. Further, communications subsystem 1330 may comprise a plurality of communications technologies, including any wired or wireless communications technology.

Processor 1320 is configured to execute programmable logic, which may be stored, along with data, on device 1310, and shown in the example of FIG. 13 as memory 1332. Memory 1332 can be any tangible, non-transitory computer readable storage medium which stores instruction code that, when executed by processor 1320 cause device 1310 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1332, device 1310 may access data or programmable logic from an external storage medium, for example through communications subsystem 1330.

In the example of FIG. 13, one or more sensors 1340 may be associated with the computing device. However, this is optional and in some cases computing device 1310 will not be associated with sensors.

Communications between the various elements of device 1310 may be through an internal bus 1360 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device for anomaly detection, the method comprising:
storing, at the computing device, a full batch model for a plurality of data points, wherein each of the plurality of data points is associated with one of a plurality of clusters, wherein the storing comprises storing in a table, information about the plurality of clusters without storing the plurality of data points, and wherein the information about the plurality of clusters comprises, for each cluster of the plurality of clusters, a number of data points within the cluster, a centroid of the cluster, a sum of features across all the data points in the cluster, and an approximate distance between points within the cluster;
receiving a new data point from a hardware sensor;
determining that the new data point falls outside the full batch model based on the stored information, thereby detecting an anomaly; and
performing an action based on the anomaly.

2. The method of claim 1, wherein the computing device creates the full batch model by:
selecting a data point;
determining that the data point falls within a threshold an average distance to a center of a cluster;
adding the data point to the cluster; and
iteratively performing the determining and adding for subsequent data points in a data point training set.

3. The method of claim 2, wherein the adding the data point to the cluster comprises:
incrementing an index indicating a number of data points within the cluster;
adding information for the data point to a sum of features for the cluster;
updating a centroid of the cluster; and
updating a value comprising an approximate distance between points in the cluster.

4. The method of claim 2, further comprising:
determining that a second data point does not fall within the threshold of the average distance to the center of the cluster; and
creating a new cluster for the data point.

5. The method of claim 4, further comprising:
determining that a number of clusters in the anomaly detection system exceeds a function;

removing all clusters with a single data point in the cluster from the anomaly detection system; and updating the threshold to a higher value.

6. The method of claim 5, wherein the function is a function of a square root below a total number of data points processed.

7. The method of claim 1, wherein the computing device stores only incremental information about each cluster.

8. The method of claim 1, wherein the action comprises at least one of:

providing an alert; and autonomously controlling a device associated with the computing device.

9. The method of claim 1, wherein the computing device is an edge device within an internet of things system.

10. A computing device for anomaly detection, the computing device comprising:

a processor;

memory; and a communications subsystem, wherein the computing device is configured to:

store a full batch model for a plurality of data points, wherein each of the plurality of data points is associated with one of a plurality of clusters, wherein the storing comprises storing in a table, information about the plurality of clusters without storing the plurality of data points, and wherein the information about the plurality of clusters comprises, for each cluster of the plurality of clusters, a number of data points within the cluster, a centroid of the cluster, a sum of features across all the data points in the cluster, and an approximate distance between points within the cluster;

receive a new data point from a hardware sensor;

determine that the new data point falls outside the full batch model based on the stored information, thereby detecting an anomaly; and perform an action based on the anomaly.

11. The computing device of claim 10, wherein the computing device is configured to create the full batch model by:

selecting a data point;

determining that the data point falls within a threshold an average distance to a center of a cluster;

adding the data point to the cluster; and iteratively perform the determining and adding for subsequent data points in a training data point set.

12. The computing device of claim 11, wherein the computing device is configured to add the data point to the cluster by:

incrementing an index indicating a number of data points within the cluster;

adding information for the data point to a sum of features for the cluster;

updating a centroid of the cluster; and updating a value comprising an approximate distance between points in the cluster.

13. The computing device of claim 11, wherein the computing device is further configured to:

determine that a second data point does not fall within the threshold of the average distance to the center of the cluster; and create a new cluster for the data point.

14. The computing device of claim 13, wherein the computing device is further configured to:

determine that a number of clusters in for anomaly detection exceeds a function;

remove all clusters with a single data point in the cluster; and update the threshold to a higher value.

15. The computing device of claim 14, wherein the function is a function of a square root below a total number of data points processed.

16. The computing of claim 10, wherein the computing device stores only incremental information about each cluster.

17. The computing device of claim 10, wherein the action comprises at least one of:

providing an alert; and autonomously controlling a device associated with the computing device.

18. The computing device of claim 10, wherein the computing device is an edge device within an internet of things system.

19. A non-transitory computer storage medium for storing instruction code for anomaly detection, which, when executed by a processor on a computing device, cause the computing device to:

store a full batch model for a plurality of data points, wherein each of the plurality of data points is associated with one of a plurality of clusters, wherein the storing comprises storing in a table, information about the plurality of clusters without storing the plurality of data points, and wherein the information about the plurality of clusters comprises, for each cluster of the plurality of clusters, a number of data points within the cluster, a centroid of the cluster, a sum of features across all the data points in the cluster, and an approximate distance between points within the cluster;

receive a new data point from a hardware sensor;

determine that the new data point falls outside the full batch model based on the stored information, thereby detecting an anomaly; and perform an action based on the anomaly.

* * * * *